United States Patent
Huckfeldt et al.

(10) Patent No.: US 6,393,571 B1
(45) Date of Patent: May 21, 2002

(54) ELECTRONIC CIRCUIT FOR ACTUATING A MICROPROCESSOR WITH PROMPTING AND ACTION SIGNALS

(75) Inventors: Olaf Huckfeldt, Hagen; Jorg Delwig, Neuenrade; Volker Stratmann, Schwerte, all of (DE)

(73) Assignee: Leopold Kostal GmbH & Co. (DE)

( * ) Notice: Subject to any disclaimer, the term of this patent is extended or adjusted under 35 U.S.C. 154(b) by 0 days.

(21) Appl. No.: 09/581,291

(22) PCT Filed: Dec. 10, 1998

(86) PCT No.: PCT/EP98/08052

§ 371 Date: Jun. 9, 2000

§ 102(e) Date: Jun. 9, 2000

(87) PCT Pub. No.: WO99/31568

PCT Pub. Date: Jun. 24, 1999

(30) Foreign Application Priority Data

Dec. 12, 1997 (DE) .......................................... 197 55 259

(51) Int. Cl.[7] ................................................ G06F 1/26
(52) U.S. Cl. ........................ 713/320; 713/300; 713/323; 713/324
(58) Field of Search ................................ 713/320, 300, 713/310, 322, 323, 324, 340; 365/226, 227

(56) References Cited

U.S. PATENT DOCUMENTS

| | | | | |
|---|---|---|---|---|
| 5,051,622 A | * | 9/1991 | Pleva | 307/465 |
| 5,239,520 A | * | 8/1993 | Arnold | 368/10 |
| 5,796,992 A | * | 8/1998 | Reif et al. | |
| 5,812,482 A | * | 9/1998 | Jiang et al. | 365/230.06 |
| 5,903,766 A | * | 5/1999 | Walker et al. | 713/300 |
| 5,959,537 A | * | 9/1999 | Banting et al. | 340/664 |
| 6,085,325 A | * | 7/2000 | Jackson et al. | 713/300 |

FOREIGN PATENT DOCUMENTS

| | | |
|---|---|---|
| DE | 37 39 227 C2 | 9/1989 |
| DE | 39 26 178 A1 | 2/1991 |
| EP | 0 744 322 A2 | 11/1996 |
| EP | 0 744 322 * | 11/1996 |
| JP | 62 187905 A | 8/1987 |
| JP | 07 044209 A | 2/1995 |
| JP | 07 044211 A | 2/1995 |
| JP | 08 241205 A | 9/1996 |

* cited by examiner

*Primary Examiner*—Ario Etienne
(74) *Attorney, Agent, or Firm*—Brooks & Kushman, P.C.

(57) ABSTRACT

An electronic circuit for supplying prompting and action signals to a microprocessor includes quiescent and operating mode circuits and switches. The quiescent circuit supplies a prompting signal to a microprocessor prompting interrupt input. The prompting signal respectively corresponds to a logical 0 or 1 when the prompting signal voltage is below or above a threshold. The operating circuit supplies an action signal to a microprocessor action input when the microprocessor is in the operating mode. Internal switches switch between operation of the quiescent and operating circuits in response to the microprocessor mode and prevent electric current flow in the operating circuit when the microprocessor is in the quiescent mode. An external switch controls the quiescent and operating circuits to generate respective prompting and action signals. The prompting interrupt input generates an interrupt for switching the microprocessor from the quiescent mode to the operating mode.

5 Claims, 2 Drawing Sheets

Figure 1:
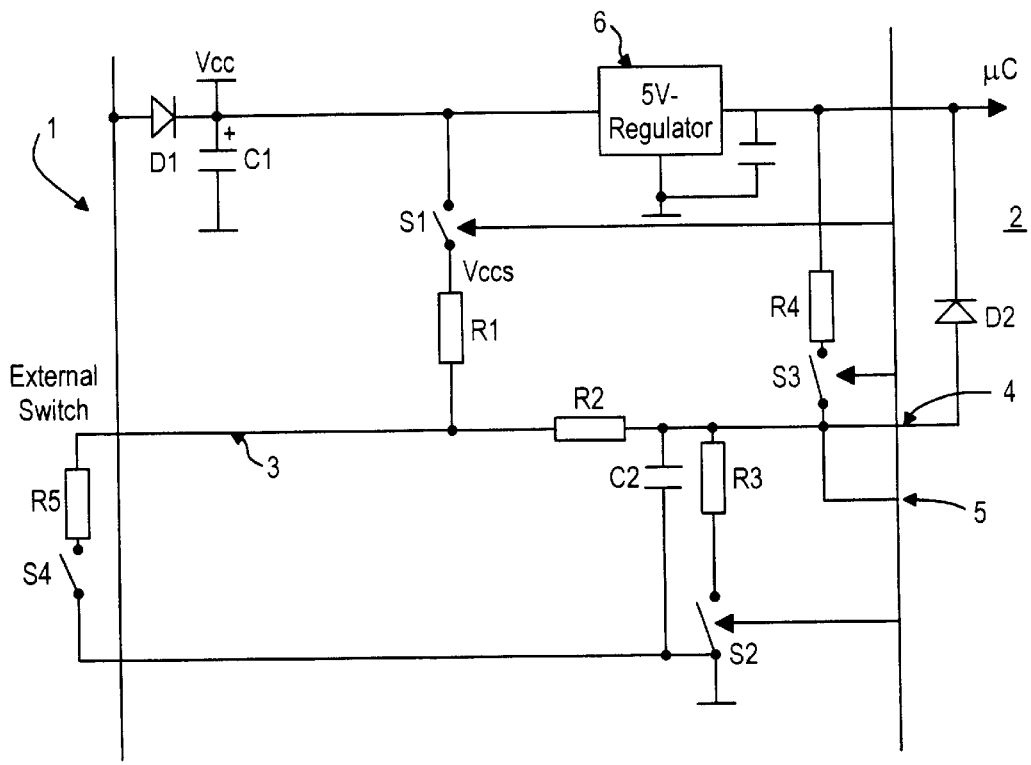

ELECTRONIC CIRCUIT FOR ACTUATING A MICROPROCESSOR WITH PROMPTING AND ACTION SIGNALS

TECHNICAL FIELD

The invention pertains to the field of electronic circuit arrangements, by means of which wake-up and action signals are applied to microprocessors.

BACKGROUND ART

It is known that microprocessors are used for controlling various actuators. In particular, microprocessors are also used for control purposes in the automotive industry. These microprocessors must continue to operate when the engine is shut off. One example of such a control unit is a door control unit. In order to reduce the load on the car battery from control devices that contain such microprocessors, it was proposed to toggle the microprocessor between a quiescent mode and operating mode. This can be realized by utilizing a corresponding monitoring device: a so-called watchdog. It is quite obvious that much less current is consumed during the intervals that the microprocessor is in quiescent mode as opposed to operating mode. Due to the circuit design, unused cross currents that also load the battery in quiescent mode flow through the circuit arrangement connected in series on the input side of the microprocessor.

When the microprocessor is in operating mode, the corresponding inputs to which action signals may be applied are scanned by the microprocessor. If an action signal is not applied to any of these inputs, the microprocessor switches back to quiescent mode. Consequently, an action signal can only cause the microprocessor to execute the desired operation if the microprocessor is coincidentally in the operating mode. In order to prevent the occurrence of an unnecessarily long waiting period before the desired operation takes place following the generation of an action signal by the user, the toggle frequency between quiescent mode and operating mode of the microprocessor must be designed such that mode changes take place approximately every 80–100 ms. A delay greater than 100 ms may be noticeable to the user and perceived as an inconvenience. During the adjustment of such circuitry, the required transition time for the microprocessor clock must also be taken into consideration, with the transition time usually lying between 5 ms and 20 ms.

Although this toggling results in reduced current consumption in comparison to circuit arrangements that do not toggle between a quiescent mode and an operating mode, the microprocessor is frequently switched to operating mode when no control operation is to be performed.

SUMMARY OF THE INVENTION

Based on the previously discussed state of the art, the invention is based on the objective of making available an electronic circuit arrangement for applying wake-up and action signals to a microprocessor that makes it possible to achieve a further reduction in current consumption in comparison to the above-mentioned state of the art.

According to the invention, this objective is attained with an electronic circuit arrangement for applying wake-up and action signals to a microprocessor which contains at least one external switch that is assigned to the circuit arrangement and serves for generating said signals, where said circuit arrangement contains a quiescent mode circuit for generating a wake-up signal that triggers a wake-up interrupt when the microprocessor must be switched from quiescent mode into operating mode and an operating mode circuit for generating action signals, where the quiescent mode circuit is connected to a wake-up-compatible digital input of the microprocessor and the operating mode circuit is connected to an analog input of the microprocessor, where at least one said external switch is assigned to both circuits, where said circuit arrangement also contains switching means, whereby the circuit arrangement can be switched between operation of the quiescent mode circuit and operation of the operating mode circuit as a function of the operating mode of the microprocessor (quiescent mode or operating mode) when the other respective circuit is switched off, where the wake-up-compatible input of the microprocessor is configured by utilizing a predetermined threshold voltage or a threshold voltage interval in such a way that this input generates a wake-up interrupt when the wake-up signal corresponds to either a logical 0 or 1, where the logical 0 corresponds to a voltage below the threshold voltage and the logical 1 corresponds to a voltage above the threshold voltage.

Due to the circuit arrangement according to the invention, a wake-up interrupt is generated at the wake-up-compatible digital input of the microprocessor only if the microprocessor actually must take over or execute certain functions. Consequently, current is only consumed when it is required that the microprocessor be operational. In order to prevent undesirable cross currents from flowing during quiescent mode, the circuit arrangement contains a quiescent mode circuit and an operating mode circuit, where current is prevented from flowing in the operating mode circuit during quiescent mode due to the arrangement of a suitable switching means. Consequently, no cross current will flow. Conversely, the quiescent mode circuit is interrupted from operating mode.

In addition, in the present invention the wake-up-compatible input of the microprocessor can be configured in such a way that a wake-up interrupt is generated as a function of the chosen configuration, namely when the wake-up signal corresponds to one of a logical 0 or 1. For this purpose, the wake-up-compatible input of the microprocessor is preferably configured in such a way that predetermined threshold voltages separate the logic levels, where a logical 0 corresponds to a voltage below the lower threshold voltage and a logical 1 corresponds to a voltage above the upper threshold voltage. However, it would also be conceivable to define only one threshold voltage to separate a logical 0 from a logical 1 instead of the previously described threshold voltage interval with upper and lower threshold voltages. Consequently, a voltage that does not generate a wake-up interrupt is applied to the wake-up-compatible input in quiescent mode. Only when an action must be triggered or controlled by the microprocessor due to the actuation of the external switch does a corresponding voltage rise or a corresponding voltage drop, i.e., a trigger, occur depending on the configuration of the microprocessor input such that the desired wake-up interrupt is realized due to the changed voltage.

According to one particularly practical embodiment, it is proposed that the wake-up interrupt be generated when a logical 0 is applied to the wake-up-compatible microprocessor input, i.e., a wake-up interrupt is generated by a voltage drop at this input. Such a voltage drop can be realized e.g., by connecting a pull-up resistor, which is connected to a power supply regulator, to the quiescent mode circuit via a switching means. The voltage made available by the voltage regulator is correspondingly applied to the wake-up-compatible input of the microprocessor. The external switch is also connected to the wake-up-compatible input of the microprocessor via a control line. A resistor is inserted into this control line such that a voltage divider is formed in cooperation with the pull-up resistor and the control line that is connected to the wake-up-compatible input of the microprocessor. Once the switch is actuated, the quiescent mode circuit is closed such that the voltage divider is effectively engaged by the pull-up resistor and the resistor arranged it the control line, so that a voltage drop below the threshold voltage takes place at the microprocessor input. This triggers the wake-up interrupt of the microprocessor in the form of a logical 0.

Once the microprocessor clock is in steady state and is stable, the switching means assigned to the pull-up resistor is opened and the switching means provided for switching off the operating mode circuit is/are closed. The action signals generated as a result of the external switching means remaining closed or due to repeated or additional actuation of this switching means are applied to the analog input of the microprocessor which is now functional due to the available A/D converter.

A preferred circuit arrangement contains the components for operating the quiescent mode circuit as well as the components for operating the operating mode circuit. Both circuits are preferably provided with a common control line, which is used for applying signals to the interconnected inputs of the microprocessor and into which the external switch is inserted. These refinements result in space savings regarding the circuit design and reduce the number of required components to a minimum. In addition, only electronic components of the simplest type are required for realizing such a circuit arrangement.

Figure 2:
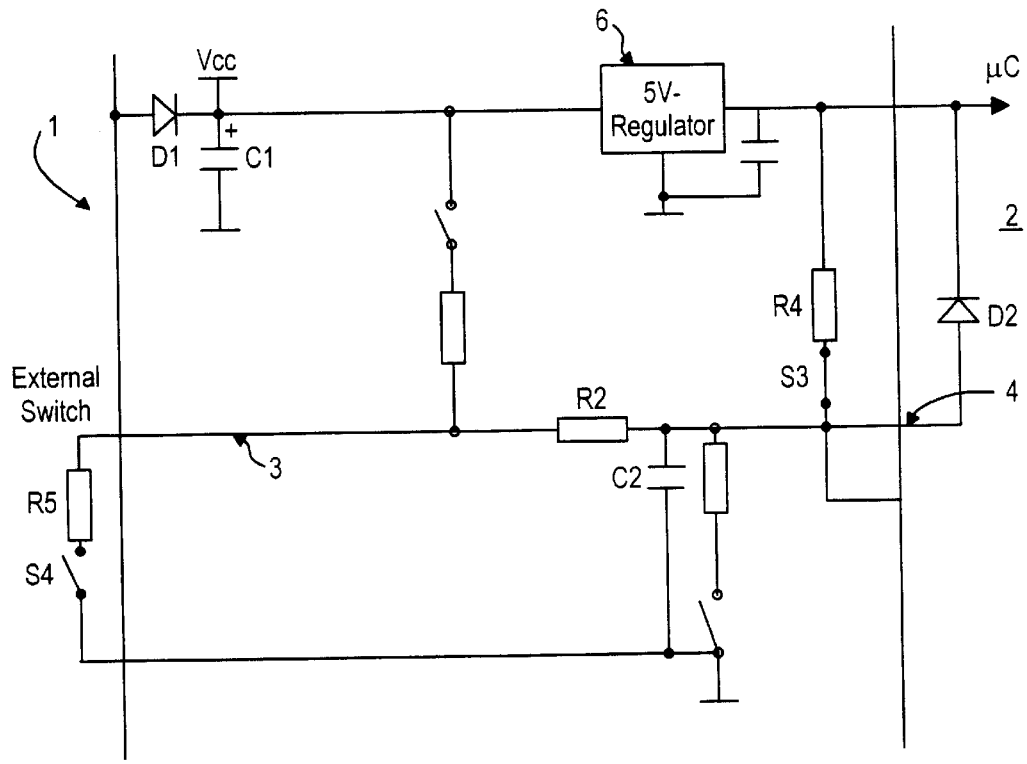
Figure 3:
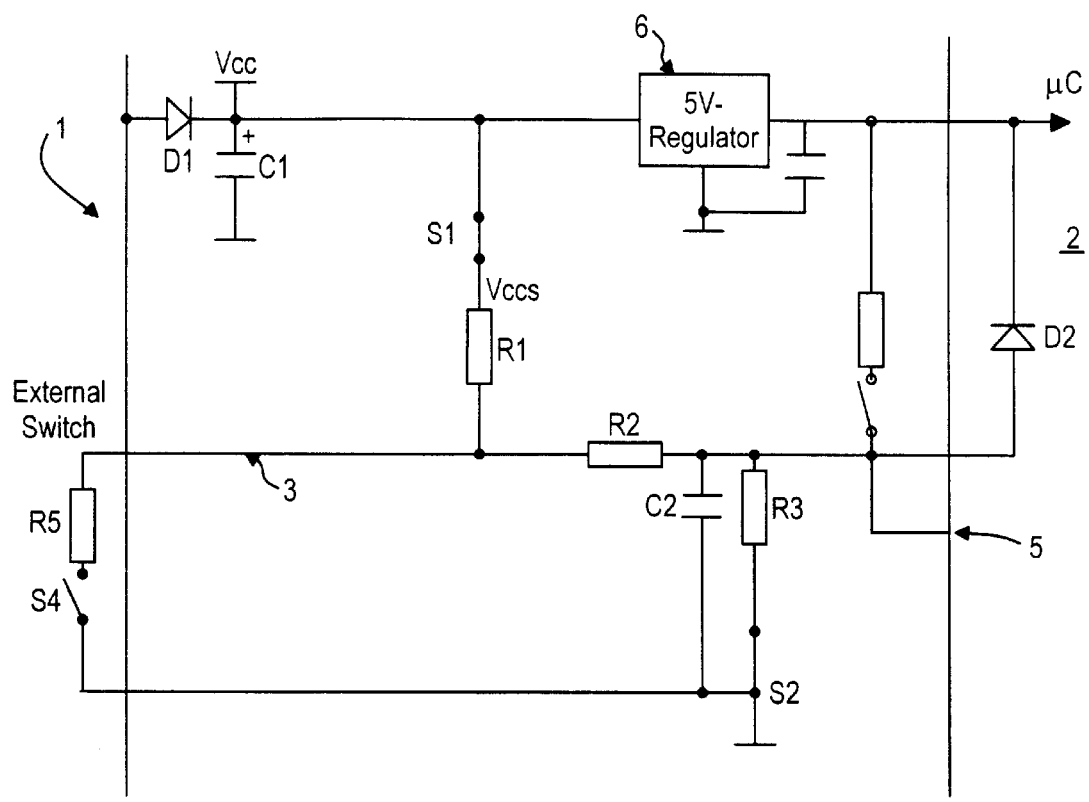

Additional advantages and embodiments of the invention are described below with reference to an embodiment example. Shown are:

FIG. 1, an electronic circuit arrangement for applying wake-up and action signals to a microprocessor, with a quiescent mode circuit and an operating mode circuit;

FIG. 2, the quiescent mode circuit of the circuit arrangement shown in FIG. 1, and FIG. 3, the operating mode circuit of the circuit arrangement shown in FIG. 1.

BEST MODE FOR CARRYING OUT THE INVENTION

The circuit arrangement 1 shown, in FIG. 1 serves for generating wake-up and action signals in order to control a microprocessor 2 (not illustrated in detail). An external switch S4 that serves for triggering the wake-up signal as well as one or more action signals is assigned to the circuit arrangement 1. The external switch S4 is realized in the form of a momentary-contact switch that is connected to the wake-up-compatible digital input 4 as well as the analog input 5 of the microprocessor 2 via a control line 3. The digital input 4 and the analog input 5 are interconnected in the embodiment shown. Such a current flow is also not required as a source of quiescent current for certain electronic components. A resistor R2 is arranged in the control line 3. The circuit arrangement 1 also contains a pull-up resistor R4 that is connected to the output of a voltage regulator 6. The pull-up resistor R4 can be connected to the control line 3 via switching means S3.

Since microprocessors are frequently provided with such pull-up resistors that can be connected to corresponding microprocessor inputs via switching means, these components which are frequently not used in a microprocessor can be used for realizing the circuit arrangement according to the invention. It may also be conceivable to integrate the switching means S2 into the microprocessor 2. Measures of this type correspondingly reduce the expenditure for the remaining circuit arrangement.

The momentary-contact switch S4 can be supplied with current via an additional resistor R1 that can be connected by means of an additional switching means S1.

In the embodiment shown in the figures, the momentary-contact switch S4 is coded in analog fashion by a resistor R5. In order to prevent cross currents from flowing in quiescent mode of the circuit arrangement 1, i.e., when the operating mode circuit is switched off, an additional switching means S2 is provided. The switching means S2 as well as the resistor R3 assigned to this switching means can be eliminated in instances in which an input signal that is not coded in analog fashion is used instead of the momentary-contact switch S4.

The switching means S1, S2, S3 used in the circuit arrangement 1 can be switched into one of two positions under the control of the microprocessor. Transistors are preferably used as the switching means S1, S2, S3.

The function of the circuit arrangement 1 will be explained with reference to FIGS. 2 and 3. FIG. 2 shows the circuit elements of the circuit arrangement 1 which are active in quiescent mode: namely the quiescent mode circuit. This configuration is realized when the switching means S1 and S2 are open and the switching means S3 is closed before the microprocessor 2 changes from its operating mode into quiescent mode. The circuit shown in FIG. 2 indicates that no cross currents are able to flow from a current source to ground due to the open switches S1, S2. The voltage made available by the voltage regulator 6 is applied to the digital input 4 of the microprocessor 2 via the pull-up resistor R4 once the switching means S3 is closed, so that when a voltage regulator that makes available 5 V is used e.g., 4.5 V is applied to the digital input. Since the digital input 4 is configured with a lower threshold voltage of 1.5 and a wake-up interrupt is only triggered at voltages below 1.5 V, the microprocessor 2 remains in quiescent mode. The voltage that is also applied to the analog input 5 which is interconnected with the digital input 4 does not lead to a response from the microprocessor 2 because the A/D converter of the microprocessor 2 is inactive in the quiescent mode.

Current passes through the momentary-contact switch S4 via the resistor R4, the switching means S3 and the resistors R2 and R5. Voltage from the voltage regulator 6 which is applied to the digital input 4 of the microprocessor 2 is also applied to the momentary-contact switch S4, therefore, a diode D2 is used at the microprocessor 2 so that no undesirable cross currents flow.

In order to generate a wake-up interrupt for the microprocessor 2, the momentary-contact switch S4 is actuated (=closed). With the closing of the momentary-contact switch S4, current path to ground is produced so that an active voltage divider is formed by the resistors R4 and R2 in cooperation with the resistor R5 provided for the analog coding of the momentary-contact switch S4. Consequently, a voltage drop can be detected at the digital input 4 of the microprocessor 2. Due to the values chosen for the resistors R4, R2 and R5, this voltage drop lies below the threshold voltage of 1.5 V. This signal is the wake-up signal and represents a logical 0, so that there results a wake-up interrupt of the microprocessor 2.

Once the microprocessor 2 is operative, the switching means S3 is opened and the switching means S1 and S2 are closed. This situation which represents the operating mode or the operation of the operating mode circuit of the circuit arrangement 1, is illustrated in FIG. 3. In operating mode, the momentary-contact switch S4 is supplied with current by the operating mode circuit and consequently by the resistor R1 and the closed switch S1. Since the switching means S2 is also closed, the resistors R2 and R3 act as voltage dividers for the analog input 5 of the microprocessor 2. Actuations of the momentary-contact switch are read in by means of the analog input and evaluated. Once the desired control or operation is carried out by the microprocessor 2, the microprocessor switches back into quiescent mode.

It may be practical to close the switching means S1 in cyclical fashion in quiescent mode. In this way, the operating voltage is applied to the momentary-contact switch S4 in cyclical fashion via the resistor R1. In case of an actuation, this produces a higher momentary-contact switch current if customary values for the resistors R1 and R4 are chosen, where the value of R1 is significantly smaller than R4. Accordingly, parasitic resistances, e.g. due to moisture in the plug, can also be applied to the operating voltage in low-ohmic and cyclical fashion in quiescent mode.

The description of the invention indicates that the described circuit arrangement not only has a very simple design due, specifically, to its use of voltage dividers, but is also free of cross currents in quiescent mode of the circuit arrangement 1. Due to these measures, a voltage source, e.g., a car battery, is only subjected to load when it is necessary for the microprocessor 2 to be functional. Such a microprocessor-controlled action takes place immediately after the transition time of the clock and the evaluation of the action signal such that the desired operation is executed without a noticeable delay to the user.

What is claimed is:

1. An electronic circuit for supplying prompting and action signals to a microprocessor, the microprocessor having a quiescent mode and an operating mode, the electronic circuit comprising:

a quiescent mode circuit for supplying a prompting signal having a voltage to a prompting interrupt digital input of a microprocessor, wherein the prompting signal corresponds to a logical 0 when the voltage of the prompting signal is below a threshold voltage and the prompting signal corresponds to a logical 1 when the voltage of the prompting signal is above the threshold voltage;

an operating mode circuit for supplying an action signal to an action analog input of the microprocessor when the microprocessor is in the operating mode;

switching means operable for switching between operation of the quiescent mode circuit and operation of the operating mode circuit in response to the mode of the microprocessor, wherein the switching means enables the quiescent mode circuit and disables the operating mode circuit when the microprocessor is in the quiescent mode and enables the operating mode circuit and disables the quiescent mode circuit when the microprocessor is in the operating mode, wherein the switching means prevents electric current from flowing in the operating mode circuit when the microprocessor is in the quiescent mode; and an external switch operable with the quiescent mode circuit and the operating mode circuit for controlling the quiescent mode circuit to generate a prompting signal upon actuation and for controlling the operating mode circuit to generate an action signal upon actuation;

wherein the prompting interrupt digital input of the microprocessor generates a prompting interrupt for switching the microprocessor from the quiescent mode to the operating mode when the voltage of the prompting signal corresponds to one of a logical 0 or 1.

2. The electronic circuit of claim 1 wherein:

the prompting interrupt digital input of the microprocessor generates a prompting interrupt for switching the microprocessor from the quiescent mode to the operating mode when the voltage of the prompting signal corresponds to a logical 0, wherein the quiescent mode circuit includes a pull-up resistor connected to a power supply regulator for controlling the voltage of the prompting signal, wherein the pull-up resistor and the power supply regulator lowers the voltage of the prompting signal below the threshold voltage upon actuation of the external switch.

3. The electronic circuit of claim 2 wherein:

the quiescent mode circuit includes a voltage divider connected to the prompting input of the microprocessor, wherein the voltage divider is closed upon actuation of the external switch to cause the voltage of the prompting signal to drop below the threshold voltage upon actuation of the external switch.

4. The electronic circuit of claim 1 wherein:

the quiescent mode circuit and the operating mode circuit have a common control line for supplying prompting and action signals to the microprocessor and for connecting the external switch to the prompting interrupt and action inputs of the microprocessor.

5. The electronic circuit of claim 1 wherein:

the switching means includes transistors.

* * * * *